(12) United States Patent
Fiello et al.

(10) Patent No.: US 11,773,794 B2
(45) Date of Patent: *Oct. 3, 2023

(54) THROTTLE CONTROLLED INTAKE SYSTEM

(71) Applicant: K&N Engineering, Inc., Riverside, CA (US)

(72) Inventors: Jonathan Richard Fiello, Yucaipa, CA (US); Gilbert Heck, Nuveo, CA (US); Steve Williams, Cherry Valley, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,175

(22) Filed: Nov. 17, 2021

(65) Prior Publication Data

US 2022/0074359 A1 Mar. 10, 2022

Related U.S. Application Data

(63) Continuation of application No. 16/937,423, filed on Jul. 23, 2020, now Pat. No. 11,181,055.
(Continued)

(51) Int. Cl.
*F02M 35/024* (2006.01)
*F02D 41/24* (2006.01)
(Continued)

(52) U.S. Cl.
CPC ...... *F02D 41/0002* (2013.01); *B60R 16/0207* (2013.01); *B60R 16/0231* (2013.01);
(Continued)

(58) Field of Classification Search
CPC ...... F02D 41/0002; F02D 9/08; F02D 11/105; F02D 2200/0404; F02D 41/2412;
(Continued)

(56) References Cited

U.S. PATENT DOCUMENTS 5,040,508 A * 8/1991 Watanabe ............... F02D 11/10
123/399
5,686,840 A * 11/1997 Johnson ................. G01D 18/00
340/653

(Continued)

*Primary Examiner* — Mahmoud Gimie
(74) *Attorney, Agent, or Firm* — Rutan & Tucker LLP; Hani Z. Sayed

(57) ABSTRACT

A throttle-controlled intake system is disclosed that provides a driver of a vehicle with greater control over engine functions and vehicle performance. The throttle-controlled intake system includes a control module that is coupled with an aircharger air intake. The control module processes input signals from a throttle pedal of the vehicle and sends modified throttle position signals to a throttle body of the vehicle so as to increase throttle responsiveness of the vehicle. The throttle-controlled intake system further includes a wiring harness and a signal adjuster. The wiring harness electrically couples the control module with the throttle pedal and the throttle body. The control module sends signals directly to the throttle body of the engine, bypassing an electronic control unit of the vehicle. The signal adjuster includes a rheostat that enables manual adjustment of the throttle responsiveness of the vehicle.

20 Claims, 4 Drawing Sheets

Related U.S. Application Data

(60) Provisional application No. 62/878,242, filed on Jul. 24, 2019.

(51) Int. Cl.

| | | |
|---|---|---|
| *F02D 11/10* | (2006.01) | |
| *F02D 9/08* | (2006.01) | |
| *F02D 41/00* | (2006.01) | |
| *F02M 35/10* | (2006.01) | |
| *F02M 35/02* | (2006.01) | |
| *B60R 16/023* | (2006.01) | |
| *B60R 16/02* | (2006.01) | |

(52) U.S. Cl.
CPC .............. *F02D 9/08* (2013.01); *F02D 11/105* (2013.01); *F02D 41/2412* (2013.01); *F02M 35/024* (2013.01); *F02M 35/0204* (2013.01); *F02M 35/10144* (2013.01); *F02M 35/10249* (2013.01); *F02D 2200/0404* (2013.01); *F02D 2200/602* (2013.01)

(58) Field of Classification Search
CPC ........... F02D 2200/602; B60R 16/0207; B60R 16/0231; F02M 35/0204; F02M 35/024; F02M 35/10144; F02M 35/10249
USPC ........................................................ 123/343
See application file for complete search history.

(56) References Cited

U.S. PATENT DOCUMENTS

| | | | | |
|---|---|---|---|---|
| 5,749,427 | A * | 5/1998 | Satonaka | B60K 31/047 701/93 |
| 6,442,472 | B1 * | 8/2002 | Vivek | F02D 31/002 701/110 |
| 2004/0255906 | A1 * | 12/2004 | Sriprakash | F02D 11/106 123/399 |
| 2005/0217625 | A1 * | 10/2005 | Niaken | F02M 35/04 123/184.21 |
| 2007/0084444 | A1 * | 4/2007 | Bellistri | F02M 51/0671 123/480 |
| 2008/0237517 | A1 * | 10/2008 | Krupadanam | F02D 11/10 251/129.01 |
| 2020/0132000 | A1 * | 4/2020 | Williams | F02D 11/105 |

\* cited by examiner

FIG. 4
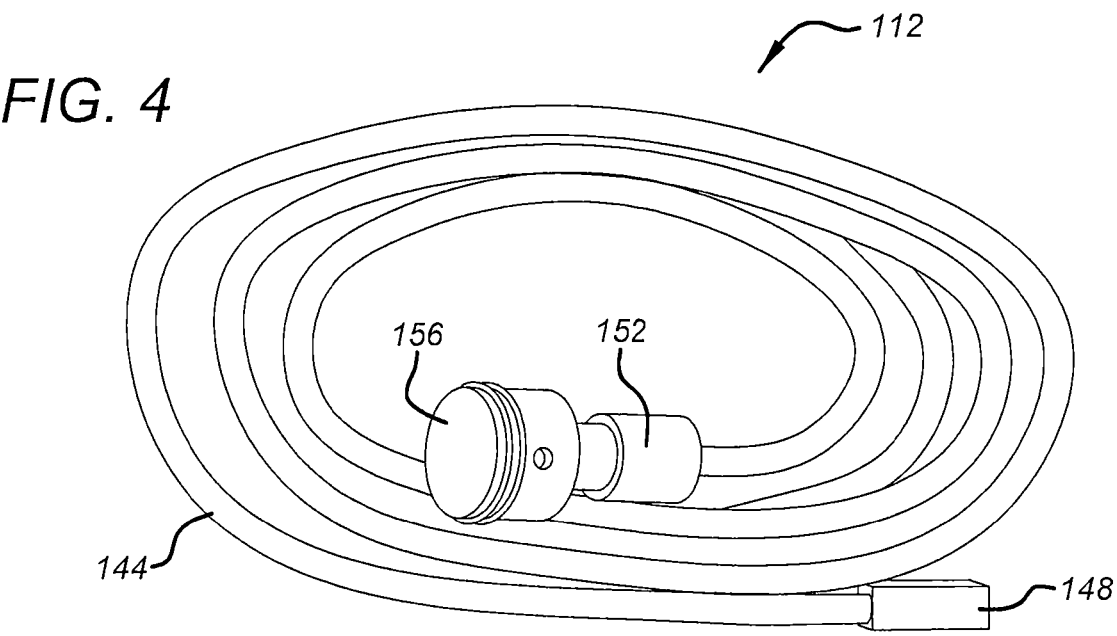
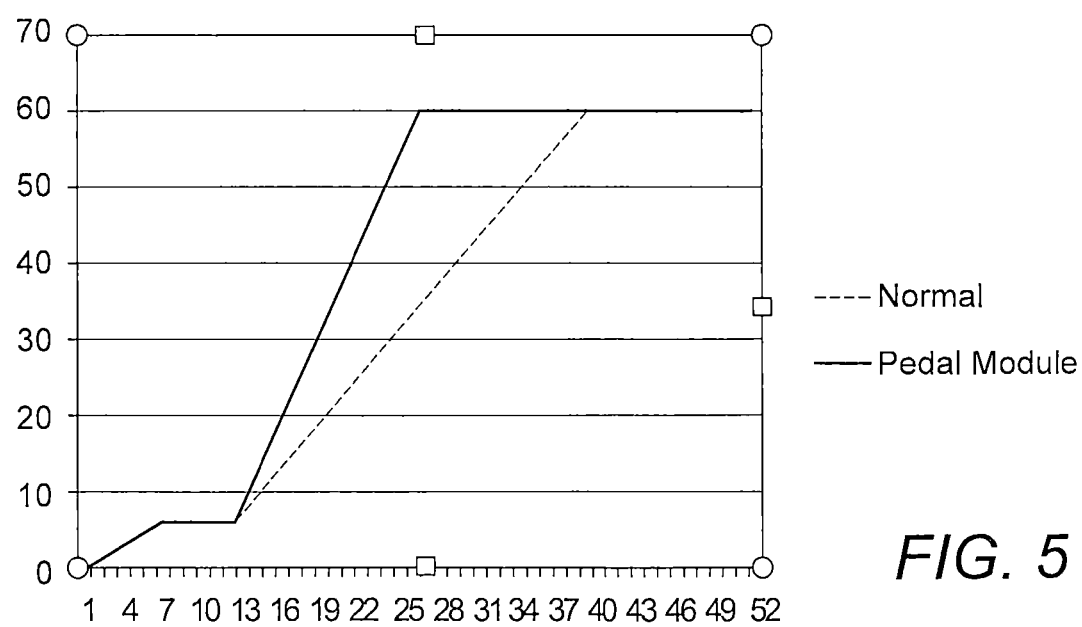
FIG. 5

THROTTLE CONTROLLED INTAKE SYSTEM

PRIORITY

This application claims the benefit of and priority to U.S. patent application Ser. No. 16/937,423 filed Jul. 23, 2020 and U.S. Provisional Application, entitled "Throttle Controlled Intake System," filed on Jul. 24, 2019 and having application Ser. No. 62/878,242, the entirety of said application being incorporated herein by reference.

FIELD

Embodiments of the present disclosure generally relate to the field of vehicle control systems. More specifically, embodiments of the disclosure relate to a throttle-controlled intake system that provides greater control over electronic throttle control functions.

BACKGROUND

Electronic throttle control (ETC) generally is an automobile technology that electronically couples an accelerator pedal to a throttle, thereby replacing a mechanical linkage. A typical ETC system includes an accelerator pedal module with two or more independent sensors, an electronic throttle body (ETB), and an engine control module (ECM). The ECM is a type of electronic control unit (ECU) configured to determine required throttle positions through calculations based on data measured by various sensors, such as accelerator pedal position sensors, an engine speed sensor, a vehicle speed sensor, and cruise control switches. The ETB is then opened and closed by way of a closed-loop control algorithm within the ECM.

A drawback to many ETC implementations is that they may overrule some driver decisions, such as delaying an amount of acceleration a driver desires from a vehicle. In some instances, the delayed acceleration is perceived as an undesirable power lag or a "flat spot" in the acceleration curve of the vehicle. As such, there is a continuing desire to provide ETC systems that are capable of providing drivers with greater control over ETC functions and vehicle performance.

SUMMARY

An apparatus and methods are provided for a throttle-controlled intake system that provides a driver of a vehicle with greater control over engine functions and vehicle performance. The throttle-controlled intake system includes a control module that is coupled with an aircharger air intake. The control module is configured to process input signals from a throttle pedal of the vehicle and send modified throttle position signals to a throttle body of the vehicle so as to increase throttle responsiveness of the vehicle. The throttle-controlled intake system further includes a wiring harness and a signal adjuster. The wiring harness is configured to electrically couple the control module with the throttle pedal and the throttle body. The control module is configured to send signals directly to the throttle body of the engine, bypassing an electronic control unit of the vehicle. The signal adjuster includes a rheostat that enables manual adjustment of the throttle responsiveness of the vehicle.

In an exemplary embodiment, a throttle-controlled intake system for providing greater control over engine performance of a vehicle comprises: an aircharger air intake system for conducting a filtered airstream to an air intake of the engine; a control module coupled with the aircharger air intake system and configured to send signals directly to a throttle body of the engine; and a wiring harness configured to electrically couple the control module with a throttle pedal and the throttle body.

In another exemplary embodiment, the aircharger air intake system comprises: an air filter comprising a filter medium configured to entrap particulates flowing within an airstream; an air box including one or more sidewalls and a mount wall; an intake tube coupled with the air filter and configured to conduct the airstream to the air intake; and an adapter configured to couple the intake tube with the air intake. In another exemplary embodiment, the one or more sidewalls are configured to receive fasteners suitable for installing the air box onto the engine. In another exemplary embodiment, the mount wall comprises an opening that receives an adapter configured to couple the air filter and the intake tube to the mount wall. In another exemplary embodiment, the intake tube comprises a shape and size suitable for conducting the airstream from the air filter into the air intake. In another exemplary embodiment, the intake tube is comprised of an arrangement of one or more bends and one or more straight portions for communicating the airstream from the air filter to the air intake.

In another exemplary embodiment, the control module is configured to create an increase in throttle responsiveness of the vehicle. In another exemplary embodiment, the control module is comprised of one or more microprocessors that can process input signals received from the throttle pedal. In another exemplary embodiment, the control module comprises an internal lookup table whereby throttle pedal positions may be evaluated against throttle position sensor readings received by way of the wiring harness. In another exemplary embodiment, the control module includes an input socket configured to receive a signal connector comprising the wiring harness for coupling the control module with the throttle pedal and the throttle body.

In another exemplary embodiment, the wiring harness includes a cable, a pedal connector, a throttle position sensor connector, and a signal connector. In another exemplary embodiment, the pedal connector is configured to be coupled directly with the throttle pedal, and wherein the throttle position sensor connector is configured to be coupled with a wiring harness that was originally coupled with the throttle pedal. In another exemplary embodiment, the signal connector is configured to be plugged into an input socket of the control module. In another exemplary embodiment, the wiring harness further includes a controller socket configured to be coupled with a signal adjuster to enable manual adjustment of throttle responsiveness of the vehicle.

In another exemplary embodiment, the throttle-controlled intake system further includes a signal adjuster configured to enable manual adjustment of throttle responsiveness of the vehicle, the signal adjuster comprising a cable that extends from a controller connector to a rheostat. In another exemplary embodiment, the controller connector is configured to be plugged into a controller socket comprising the wiring harness. In another exemplary embodiment, the rheostat is configured to enable manual adjustment of a throttle signal being communicated to the throttle body.

In an exemplary embodiment, a method for a throttle-controlled intake system to provide greater control over engine performance of a vehicle comprises: configuring an aircharger air intake system for conducting a filtered airstream to an air intake of the engine; configuring a control module to send signals directly to a throttle body of the engine; coupling the control module with the aircharger air intake system; and electrically coupling the control module with a throttle pedal and the throttle body.

In another exemplary embodiment, configuring the aircharger air intake system comprises: providing an air filter comprising a filter medium to entrap particulates flowing within an airstream; configuring an air box to support the air filter and be coupled with the engine; coupling an intake tube between the air filter and the air intake of the engine; and adapting the air intake tube to conduct the airstream to the air intake of the engine. In another exemplary embodiment, electrically coupling includes configuring a wiring harness whereby the control module can bypass signals sent to the throttle body by an electronic control unit of the vehicle. In another exemplary embodiment, configuring the control module includes configuring one or more microprocessors that can process input signals received from the throttle pedal.

BRIEF DESCRIPTION OF THE DRAWINGS

The drawings refer to embodiments of the present disclosure in which:

FIG. 4 illustrates an exemplary embodiment of a signal adjuster configured to facilitate manual adjustment of throttle responsiveness of the vehicle;

FIG. 5 is a graph illustrating a throttle position sensor signal as a function of throttle pedal position percentage.

Figure 1:
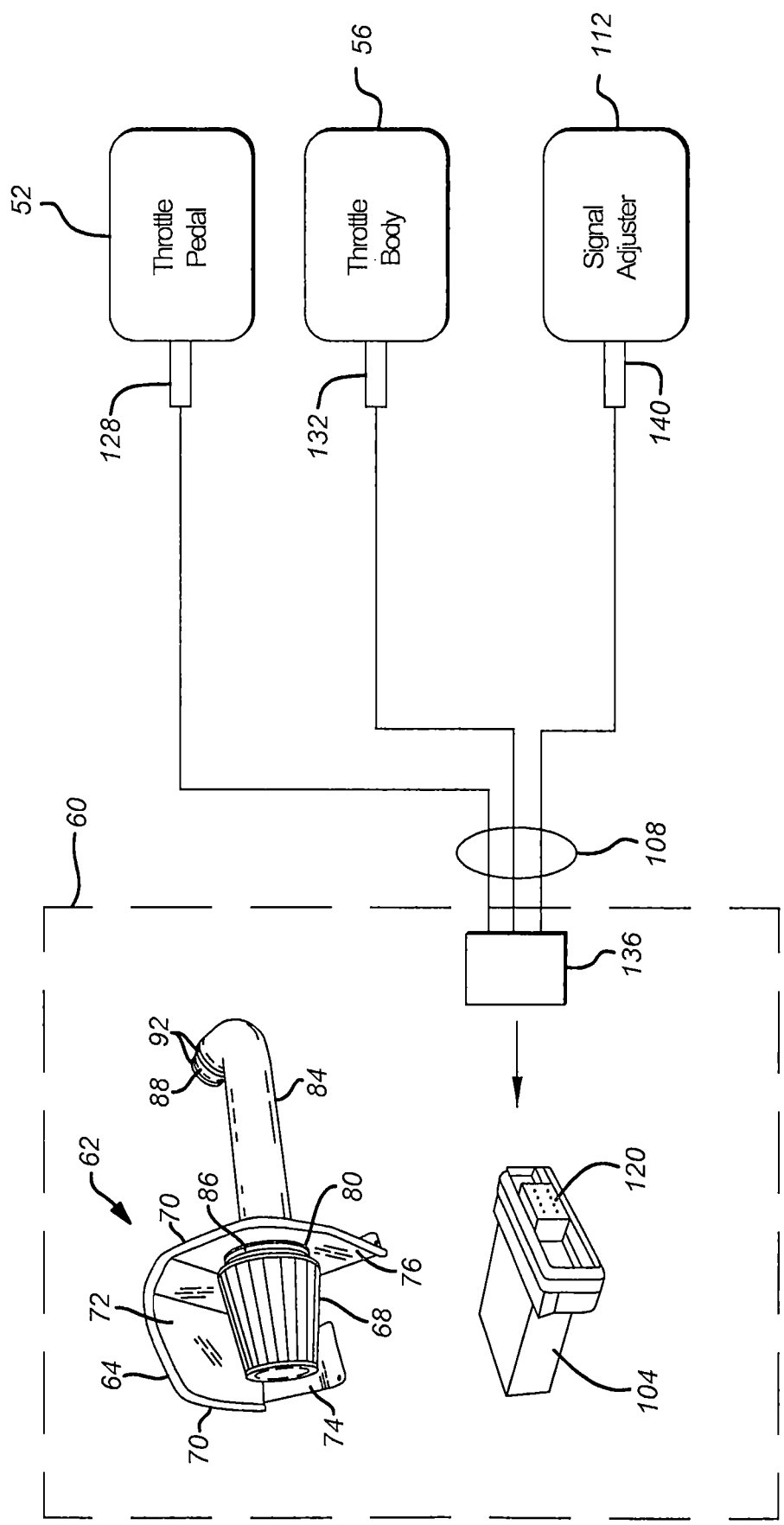
FIG. 1 illustrates an exemplary embodiment of a throttle-controlled intake system configured to provide greater control over ETC functions and vehicle performance.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first module," may be made. However, the specific numeric reference should not be interpreted as a literal sequential order but rather interpreted that the "first module" is different than a "second module." Thus, the specific details set forth are merely exemplary. The specific details may be varied from and still be contemplated to be within the spirit and scope of the present disclosure. The term "coupled" is defined as meaning connected either directly to the component or indirectly to the component through another component.

Further, as used herein, the terms "about," "approximately," or "substantially" for any numerical values or ranges indicate a suitable dimensional tolerance that allows the part or collection of components to function for its intended purpose as described herein.

FIG. 1 illustrates an exemplary embodiment of a throttle-controlled intake system 60 that is configured to provide a driver of a vehicle with greater control over ETC functions and vehicle performance. In the illustrated embodiment, the throttle-controlled intake system 60 includes an aircharger air intake 62 that is coupled with a control module 104, and a wiring harness 108. In some embodiments, a signal adjuster 112 may be included with the wiring harness 108. The throttle-controlled intake system 60 generally is configured to process input signals from a throttle pedal 52 of the vehicle and send modified throttle position signals to a throttle body 56 of the vehicle that increase the throttle responsiveness of the vehicle.

It is contemplated that the throttle-controlled intake system 60 is configured to provide a plug and play installation without requiring a practitioner to modify or fabricate components. As such, the control module 104 generally is integrated into the aircharger air intake 62, such that a practitioner need only install the aircharger air intake 62 and then connect the wiring harness 108 with the vehicle as described herein. The control module 104 may be integrated into the aircharger air intake 62 in a wide variety of different configurations without limitation, and without deviating beyond the scope of the present disclosure.

The aircharger air intake 62 generally comprises an air box 64 configured to couple an air filter 68 to an air intake of an engine. The air box 64 comprises sidewalls 72, a floor 74, and a mount wall 76. Preferably, the air box 64 is comprised of a rigid material that is sufficiently durable and temperature resistant to retain its configuration during installation and operation when coupled with the air intake of the engine. A pliable strip 70 is configured to be received along at least the top edges of the sidewalls 72 and the mount wall 76 so as to hide any sharp edges thereon.

The air filter 68 comprises a filter medium that provides an area to pass an airstream and entrap particulates and other contaminates flowing with the airstream. The filter medium may be comprised of paper, foam, cotton, spun fiberglass, or other known filter materials, woven or non-woven material, synthetic or natural, or any combination thereof. The filter medium may be pleated, or otherwise shaped, or contoured so as to increase a surface area for passing the airstream to be cleaned. The length of the filter medium in the circumferential direction may be longer than the circular circumference of the air filter 68 generally, such that the surface area of the filter medium is greater than the profile surface area of the air filter 68. Further, the air filter 68 is not limited to the exact shape illustrated, but rather may include a wide variety of generally cylindrical shapes, generally circular, oval, round, curved, conical, or other closed perimeter shape, that provide a relatively large surface area in a given volume of the filter.

In some embodiments, the filter medium comprises 4 to 6 layers of cotton gauze sandwiched between two epoxy-coated aluminum wire screens. The cotton may be advantageously treated with a suitably formulated filter oil composition that causes tackiness throughout microscopic strands comprising the filter medium. The nature of the cotton allows high volumes of airflow, and when combined with the tackiness of the filter oil composition creates a powerful filtering medium which ensures a high degree of air filtration. Further details about components comprising the air filter 68, as well as details about the filter oil composition, are disclosed in U.S. patent application Ser. No. 14/181,678, entitled "Air Box With Integrated Filter Media," filed on Feb. 16, 2014, and U.S. patent application Ser. No. 14/701,163, entitled "Filter Oil Formulation," filed on Apr. 30, 2015, the entirety of each of which is incorporated herein by reference.

The air box 64 generally is of an open variety, rather than being an enclosed air box as is conventionally utilized with many vehicles. The sidewalls 72 and the floor 74 serve to protect the air filter 68 from road debris, as well as to isolate the air filter 68 from hoses and other components that may be present within an engine bay of the vehicle. It will be recognized by those skilled in the art that the open air box 64 improves airflow to the air filter 68, and thus decreases air resistance to the air intake of the engine, thereby improving engine performance beyond that otherwise possible with an enclosed air box. The air box 64 generally is configured to be mounted, or fastened, onto the engine. As such, the sidewalls 72 are configured to receive suitable fasteners to facilitate installing the air box 64 onto the engine. It is contemplated that the fasteners generally may comprise any of suitably designed holes, brackets, molded shaped portions, protrusions, extensions, angled brackets, hardware fasteners, or other any similar device for supporting the air box 64 within the engine bay. It should be understood that the particular fasteners will vary according to the specific make and model of the vehicle with which the air box 64 is to be used.

The mount wall 76 generally is configured to support the air filter 68 and provide an interface between the air filter 68 and the air intake of the engine. An opening 80 in the mount wall 76 is configured to receive an intake tube 84 that is configured to couple the air filter 68 with the air intake of the engine. In the embodiment illustrated in FIG. 1, a suitably sized hose clamp 86 fastens the intake tube 84 within a flange of the air filter 68.

In the embodiment illustrated in FIG. 1, the intake tube 84 is coupled to the air intake of the engine by way of an adapter 88. A pair of clamps 92 ensure an airtight seal is maintained between the intake tube 84 and the air intake. The intake tube 84 preferably comprises a shape and size suitable for conducting air drawn through the air filter 68 into the air intake of the engine. As such, the intake tube 84 generally comprises an arrangement of one or more bends and one or more straight portions so as to connect the air filter 68 to the air intake of the engine. Further details about specific configurations of the intake tube 84, including various components and fasteners for installing embodiments of the aircharger air intake 62 into various vehicles are disclosed in U.S. Patent Application, entitled "Aircharger Air Intake System And Method," filed on Mar. 8, 2017, and having application Ser. No. 15/453,496, which claims the benefit of, and priority to, U.S. Provisional Application, entitled "Aircharger Air Intake System And Method," filed on Mar. 8, 2016 and having application Ser. No. 62/305,391, the entirety of each of said applications being incorporated herein by reference.

Figure 2:
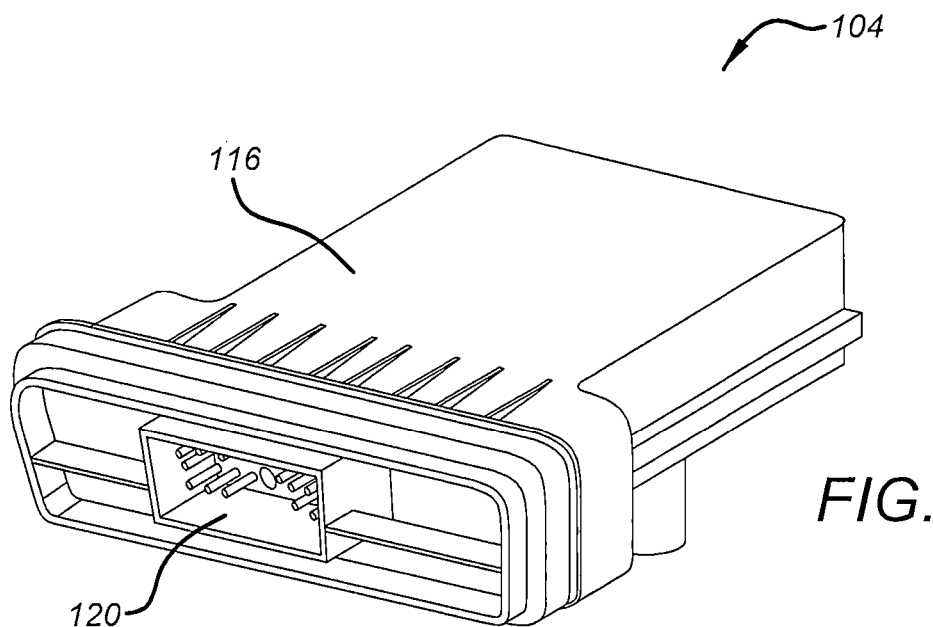
FIG. 2 illustrates an exemplary embodiment of a control module configured to create an increase in throttle responsiveness of a vehicle.

FIG. 2 illustrates an exemplary embodiment of a control module 104 that may be configured to create an increase in throttle responsiveness of a vehicle. The control module 104 generally is configured to bypass the factory signal to the ECU and send a modified signal directly to the throttle body 56 (see FIG. 1) to create an increase in throttle responsiveness and acceleration. The control module 104 may be comprised of one or more microprocessors that can process input signals received from the throttle pedal 52 of the vehicle. As will be appreciated, the control module 104 may include hardware comprising electronic components on a printed circuit board (PCB), ceramic substrate or a thin laminate substrate, and include a micro controller chip (CPU). Software may be stored in the microcontroller or other chips on the PCB, such as EPROMs or flash memory, so that the CPU can be re-programmed by uploading updated code or replacing chips. The control module 104 preferably has a fixed programming, such as an internal lookup table whereby throttle pedal 52 positions may be evaluated against throttle position sensor readings received by way of the wiring harness 108.

As shown in FIG. 2, the control module 104 includes a rigid enclosure 116 and an input socket 120. The input socket 120 is configured to receive a signal connector comprising the wiring harness 108, as discussed herein. The input socket 120 facilitates coupling the control module 104 with the throttle pedal 52 and the throttle body 56 of the vehicle, as well as coupling the control module 104 with the ECU of the vehicle. Further, it is contemplated that the rigid enclosure 116 is configured to withstand the environment encountered within an engine compartment of the vehicle for the purpose of protecting the internal circuitry of the control module 104.

Figure 3:
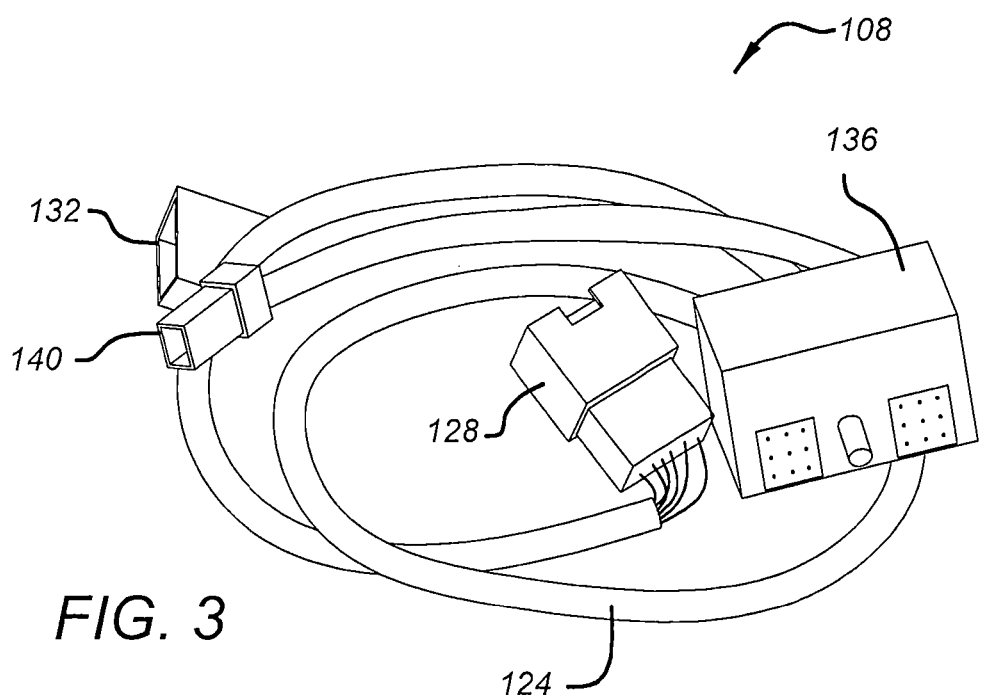
FIG. 3 illustrates an exemplary embodiment of a wiring harness configured to electrically couple the control module of FIG. 2 with a throttle pedal and a throttle body of the vehicle.

FIG. 3 illustrates an exemplary embodiment of a wiring harness 108 configured to electrically couple the control module 104 with the throttle pedal 52 and the throttle body 56 of the vehicle. The wiring harness 108 generally includes a cable 124, a pedal connector 128, a throttle position sensor (TPS) connector 132, a signal connector 136, and a controller socket 140. As will be recognized, the cable 124 includes an exterior sheath configured to protect the cable 124 from potential damage due to nearby components comprising the vehicle. The pedal connector 128 is configured to be coupled directly with the throttle pedal 52 of the vehicle, while the TPS connector 132 is configured to be coupled with the wiring harness that was originally coupled with the throttle pedal 56 (see FIG. 1). The signal connector 136 is configured to be plugged into the input socket 120 of the control module 104. Thus, the wiring harness 108 and the control module 104 effectively provide direct communication between the throttle pedal 52 and the throttle body 56, bypassing the ECU of the vehicle. The controller socket 140 is configured to be coupled with the signal adjuster 112 to facilitate the driver manually adjusting the signals being passed to the throttle body 56, as described herein. It is contemplated that, in some embodiments, the signal adjuster 112 may be omitted from the throttle-controlled intake system 60, thereby providing a fully automated adjustment of throttle responsiveness of the vehicle.

FIG. 4 illustrates an exemplary embodiment of a signal adjuster 112 configured to facilitate manual adjustment of throttle responsiveness of the vehicle. The signal adjuster 112 comprises a cable 144 that extends from a controller connector 148 to a rheostat 152. In the illustrated embodiment of FIG. 4, the cable 144 includes an exterior sheath configured to protect the cable 144 from potential damage due to nearby components comprising the vehicle. The controller connector 148 is configured to be plugged into the controller socket 140 comprising the wiring harness 108. The rheostat 152 is configured to enable a practitioner, such as the driver, to manually adjust the throttle signal being communicated to the throttle body 56 of the vehicle. The signal adjuster 112 includes a control dial 156 configured to be coupled with the rheostat 152 to facilitate hand operation of the rheostat. It is contemplated that the practitioner may mount the rheostat 152 and the control dial 156 in an advantageous location within the passenger cabin of the vehicle, such as a dashboard, and then may route the cable 144 to the wiring harness 108. The practitioner may then plug the controller connector 148 into the controller socket 140 to place the rheostat 152 into electrical communication with the control module 104.

FIG. 5 is a graph 160 illustrating a throttle position sensor signal as a function of throttle pedal position percentage. The data plotted in the graph 160 are based on experimental observations before and after installation of the throttle-controlled intake system 60 into a test vehicle. As indicated in the graph 160, the throttle-controlled intake system 60 outputs a signal showing more acceleration than would be provided in absence of the system 60. Further, graph 160 shows that when the acceleration requested by the driver levels off, the throttle-controlled intake system 60 outputs a constant pedal position. Graph 160 shows, therefore, that the throttle-controlled intake system 60 provides a desirable increase in throttle responsiveness and acceleration as compared with the performance provided by the factory ECU.

Figure 6:
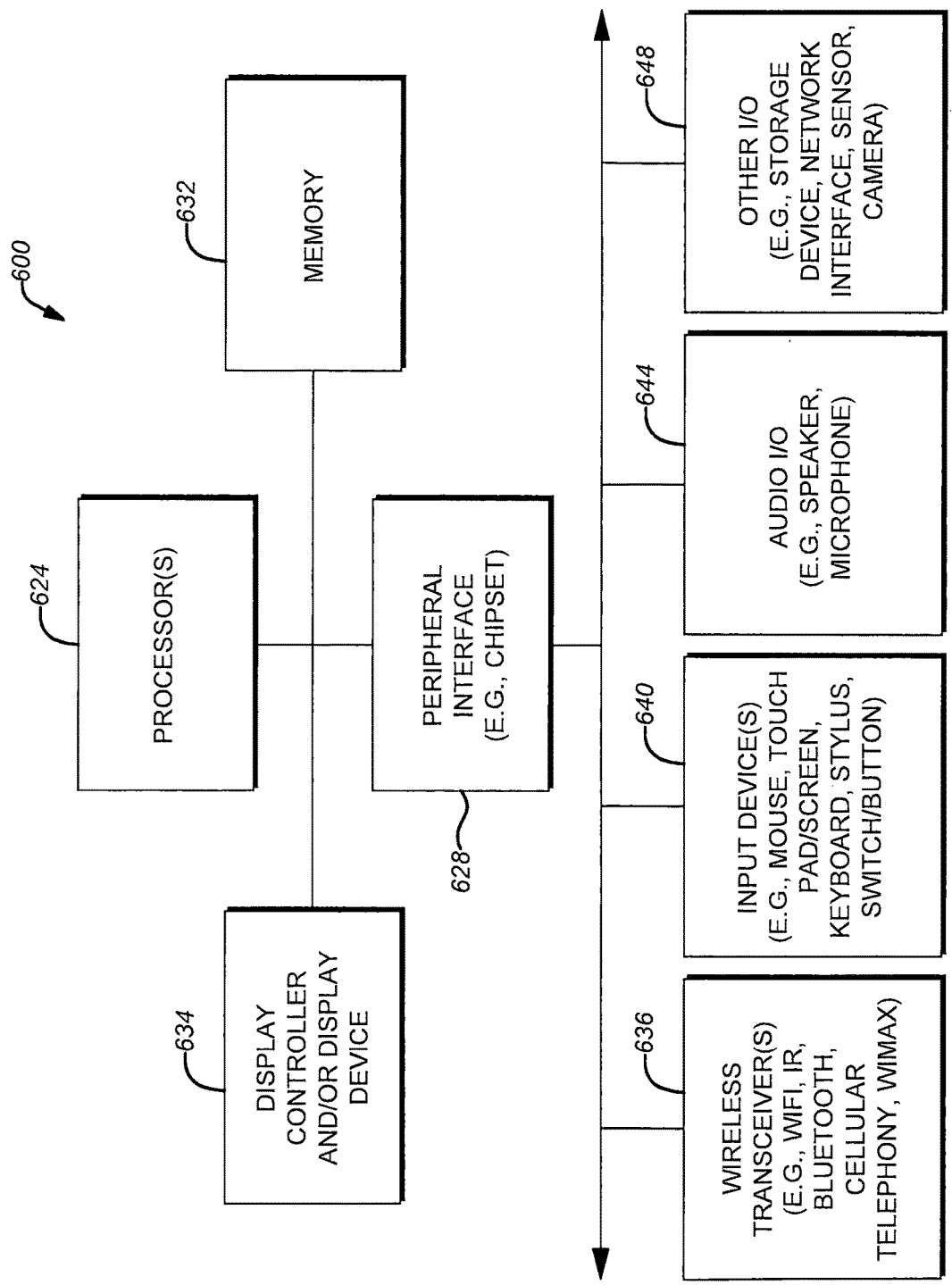
FIG. 6 is a block diagram illustrating an exemplary data processing system that may be used with a throttle control system according to the present disclosure.

FIG. 6 is a block diagram illustrating an exemplary data processing system 600 that may be used with an adjustable throttle control system, such as the throttle-controlled intake system 60 to perform any of the processes or methods described herein. System 600 may represent a desktop, a tablet, a server, a mobile phone, a media player, a personal digital assistant (PDA), a personal communicator, a network router or hub, a wireless access point (AP) or repeater, a set-top box, or a combination thereof.

In an embodiment, illustrated in FIG. 6, system 600 includes a processor 624 and a peripheral interface 628, also referred to as a chipset, to couple various components to the processor 624, including a memory 632 and devices 636-648 by way of a bus or an interconnect. Processor 624 may represent a single processor or multiple processors with a single processor core or multiple processor cores included therein. Processor 624 may represent one or more general-purpose processors such as a microprocessor, a central processing unit (CPU), and the like. More particularly, processor 624 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 624 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 624 is configured to execute instructions for performing the operations and steps discussed herein.

Peripheral interface 628 may include a memory control hub (MCH) and an input output control hub (ICH). Peripheral interface 628 may include a memory controller (not shown) that communicates with a memory 632. The peripheral interface 628 may also include a graphics interface that communicates with graphics subsystem 634, which may include a display controller and/or a display device. The peripheral interface 628 may communicate with the graphics device 634 by way of an accelerated graphics port (AGP), a peripheral component interconnect (PCI) express bus, or any other type of interconnects.

An MCH is sometimes referred to as a Northbridge, and an ICH is sometimes referred to as a Southbridge. As used herein, the terms MCH, ICH, Northbridge and Southbridge are intended to be interpreted broadly to cover various chips that perform functions including passing interrupt signals toward a processor. In some embodiments, the MCH may be integrated with the processor 624. In such a configuration, the peripheral interface 628 operates as an interface chip performing some functions of the MCH and ICH. Furthermore, a graphics accelerator may be integrated within the MCH or the processor 624.

Memory 632 may include one or more volatile storage (or memory) devices, such as random access memory (RAM), dynamic RAM (DRAM), synchronous DRAM (SDRAM), static RAM (SRAM), or other types of storage devices. Memory 632 may store information including sequences of instructions that are executed by the processor 624, or any other device. For example, executable code and/or data of a variety of operating systems, device drivers, firmware (e.g., input output basic system or BIOS), and/or applications can be loaded in memory 632 and executed by the processor 624. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 628 may provide an interface to I/O devices, such as the devices 636-648, including wireless transceiver(s) 636, input device(s) 640, audio I/O device(s) 644, and other I/O devices 648. Wireless transceiver 636 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 640 may include a mouse, a touch pad, a touch sensitive screen (which may be integrated with display device 634), a pointer device such as a stylus, and/or a keyboard (e.g., physical keyboard or a virtual keyboard displayed as part of a touch sensitive screen). For example, the input device 640 may include a touch screen controller coupled with a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio I/O 644 may include a speaker and/or a microphone to facilitate voice-enabled functions, such as voice recognition, voice replication, digital recording, and/or telephony functions. Other optional devices 648 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 648 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 6 illustrates various components of a data processing system, it is not intended to represent any particular architecture or manner of interconnecting the components; as such details are not germane to embodiments of the present disclosure. It should also be appreciated that network computers, handheld computers, mobile phones, and other data processing systems, which have fewer components or perhaps more components, may also be used with embodiments of the invention disclosed hereinabove.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A throttle-controlled intake system for providing greater control over engine performance of a vehicle, the system comprising:
   an aircharger air intake system for conducting a filtered airstream to an air intake of the engine;
   a control module coupled with the aircharger air intake system and a throttle pedal, wherein the control module is configured to send signals directly to a throttle body of the engine;
   a signal adjuster configured to enable manual adjustment of throttle responsiveness of the vehicle; and
   a rheostat configured to enable manual adjustment of a throttle signal.

2. The system of claim 1, wherein the aircharger air intake system comprises:
   an air filter comprising a filter medium configured to entrap particulates flowing within an airstream;
   an air box including one or more sidewalls and a mount wall;
   an intake tube coupled with the air filter and configured to conduct the airstream to the air intake; and
   an adapter configured to couple the intake tube with the air intake.

3. The system of claim 2, wherein the one or more sidewalls are configured to receive fasteners suitable for installing the air box onto the engine.

4. The system of claim 2, wherein the mount wall comprises an opening that receives an adapter configured to couple the air filter and the intake tube to the mount wall.

5. The system of claim 2, wherein the intake tube comprises a shape and size suitable for conducting the airstream from the air filter into the air intake.

6. The system of claim 5, wherein the intake tube is comprised of an arrangement of one or more bends and one or more straight portions for communicating the airstream from the air filter to the air intake.

7. The system of claim 1, wherein the control module is configured to create an increase in throttle responsiveness of the vehicle.

8. The system of claim 1, wherein the control module is comprised of one or more microprocessors that can process input signals received from the throttle pedal.

9. The system of claim 1, wherein the control module includes an input socket configured to receive a signal connector comprising a wiring harness for coupling the control module with the throttle pedal and the throttle body.

10. The system of claim 1, wherein the wiring harness includes a cable, a pedal connector, a throttle position sensor connector, and a signal connector.

11. The system of claim 10, wherein the pedal connector is configured to be coupled directly with the throttle pedal, and wherein the throttle position sensor connector is configured to be coupled with a wiring harness that was originally coupled with the throttle pedal.

12. The system of claim 10, wherein the signal connector is configured to be plugged into an input socket of the control module.

13. The system of claim 10, wherein the wiring harness further includes a controller socket configured to be coupled with the signal adjuster.

14. The system of claim 1, wherein the signal adjuster comprises a cable that extends from the controller connector to the rheostat.

15. The system of claim 14, wherein the controller connector is configured to be plugged into a controller socket comprising the wiring harness.

16. The system of claim 14, wherein the rheostat is configured to enable manual adjustment of the throttle signal being communicated to the throttle body.

17. A method for a throttle-controlled intake system to provide greater control over engine performance of a vehicle, the method comprising:
   configuring an aircharger air intake system for conducting a filtered airstream to an air intake of the engine;
   configuring a control module to send signals directly to a throttle body of the engine;
   coupling the control module with the aircharger air intake system;
   electrically coupling the control module with a throttle pedal and the throttle body;
   configuring a signal adjuster to enable manual adjustment of throttle responsiveness of the vehicle; and
   configuring a rheostat to enable manual adjustment of a throttle signal.

18. The method of claim 17, wherein configuring the aircharger air intake system comprises:
   providing an air filter comprising a filter medium to entrap particulates flowing within an airstream;
   configuring an air box to support the air filter and be coupled with the engine;
   coupling an intake tube between the air filter and the air intake of the engine; and
   adapting the air intake tube to conduct the airstream to the air intake of the engine.

19. The method of claim 17, wherein electrically coupling includes configuring a wiring harness whereby the control module can bypass signals sent to the throttle body by an electronic control unit of the vehicle.

20. The method of claim 17, wherein configuring the control module includes configuring one or more microprocessors that can process input signals received from the throttle pedal.

* * * * *